(12) United States Patent
Lin

(10) Patent No.: US 11,108,243 B1
(45) Date of Patent: Aug. 31, 2021

(54) SWITCHING AC/DC POWER SUPPLY SYSTEM WITH 10MHZ TIME BASE

(71) Applicant: Hong Liu Co., Ltd., Taichung (TW)

(72) Inventor: Mu-Chun Lin, Taichung (TW)

(73) Assignee: HONG LIU CO., LTD., Taichung (TW)

( * ) Notice: Subject to any disclaimer, the term of this patent is extended or adjusted under 35 U.S.C. 154(b) by 0 days.

(21) Appl. No.: 16/868,211

(22) Filed: May 6, 2020

(51) Int. Cl.
*H02M 7/02* (2006.01)
*H02J 4/00* (2006.01)

(52) U.S. Cl.
CPC ............... *H02J 4/00* (2013.01); *H02M 7/02* (2013.01)

(58) Field of Classification Search
CPC .. H02M 1/007; H02M 1/0074; H02M 1/0077; H02M 7/10; H02M 7/19; H02M 7/25
See application file for complete search history.

(56) References Cited

U.S. PATENT DOCUMENTS

| | | | | |
|---|---|---|---|---|
| 6,459,175 B1* | 10/2002 | Potega | ................ | H02J 7/00041 307/149 |
| 9,287,769 B1* | 3/2016 | Lin | ................ | H02M 7/217 |
| 2006/0083039 A1* | 4/2006 | Oliveira | ............ | H02M 7/53803 363/131 |
| 2007/0076453 A1* | 4/2007 | Schultz | ................... | H02J 1/102 363/72 |
| 2009/0290393 A1* | 11/2009 | Angerer | ................ | H02M 7/493 363/49 |
| 2015/0349534 A1* | 12/2015 | Lin | .......................... | H02J 1/102 307/75 |

* cited by examiner

*Primary Examiner* — Alex Torres-Rivera
(74) *Attorney, Agent, or Firm* — Sinorica, LLC

(57) ABSTRACT

A switching AC/DC power supply system with a 10 MHz time base includes a master and at least one slave, each of which has a time base generator, and the time base generators can provide a time base of 10 MHz. Wherein the slave has a selector switch, and when the master is coupled to the slave, the slave can obtain the time base from the time base generator of the master through the selector switch, thereby enabling the time base of the slave is fully synchronized with the master and improving the power output quality of the switching AC/DC power supply system.

5 Claims, 7 Drawing Sheets

SWITCHING AC/DC POWER SUPPLY SYSTEM WITH 10MHZ TIME BASE

FIELD OF THE INVENTION

The present invention relates to an AC/DC power supply, and more particularly to a switching AC/DC power supply system with a 10 MHz time base.

BACKGROUND OF THE INVENTION

AC/DC power supplies are categorized into linear AC/DC power supplies and switching AC/DC power supplies according to their working principles and design structures. The basic structure of a linear AC/DC power supply includes a linear amplifier with the first quadrant being DC and the first and fourth quadrants being AC and a bipolar DC power supply. If it involves bidirectional DC, they are the first and second quadrants. Linear amplifiers are generally categorized into A, B, AB, etc., and use the linear region of power components. The basic working quadrant of the switching AC/DC power supply is the same as that of the linear AC/DC power supply, except that the amplifier adopts a D amplifier. The D amplifier as a switching working mode has the advantage of high efficiency. With the advancement of wide-bandgap semiconductors (WBG) and the popularity of silicon carbide (SiC) and gallium nitride (GaN) power components, the switching operation has been further improved. The main difference between a linear amplifier and a switching amplifier is that the former uses the linear region of the power components, and the latter is only a simple switching operation. Because the linear amplifier does not involve a switching operation, it is completely different from the switching amplifier that is composed of multiple amplifiers.

Since the switching amplifier involves a switching operation, it must have a frequency relationship, and the power component determines the switching frequency. For example, the switching frequency of the insulated gate bipolar transistor (IGBT) is mostly less than 20 KHz. The switching frequency of MOSFET is about 30 KHz-100 KHz. The switching frequency of SiC MOSFET is more than 100 KHz. It can be seen that the differences in the working frequencies of the above-mentioned components are due to the characteristics of the material itself. Due to the limited working frequency of power components, the out of phase approach can be adopted to solve the above problems. In addition, the switching operation must involve frequency. When multiple switching amplifiers are connected in parallel, the switching frequency must pay attention to the phase relationship in order to establish a complete frequency domain and time domain relationship. If the switching frequency can be synchronized, electromagnetic interference (EMI) filtering can be controlled better. When multiple switching power supplies are working at the same potential, the synchronization or frequency multiplication and the opposite phase relationship are the same purpose. For multiple switching power supplies connected in parallel after out of phase, it is necessary to build a phase relationship. Obviously, in the past, for the structure of the linear power supply, the time base, timing, and phase were not included in the necessary considerations, but the switching power supply is the opposite. In addition to the above-mentioned out of phase technology to increase the equivalent working frequency, there are also the following advantages. 1. Lower frequencies are multiplied as a power source with a high-frequency effect. 2. The equivalent frequency is high, and the subsequent ripple frequency also increases. 3. The response is faster and the current density increases. 4. The pulsating current is also reduced for the previous stage, thereby improving the durability of the previous stage.

The AC/DC power supply can be achieved by a linear structure or a switching structure. If necessary, it may be a hybrid structure consisting of a switching structure and a linear structure. In short, all power supplies that use the switching operation must use a common time base to give a timing relationship as the functions of synchronization, frequency multiplication, opposite phase, and out of phase.

As for the time base, it is the time base for all analog and digital devices to handle the operations of frequency or time domain. For example, radio transmitters and receivers, high-frequency and low-frequency signal generators, frequency counters, spectrum analyzers, oscilloscopes, power analyzers, and the above-mentioned switching power supplies all require a time base as a reference. If the time base is not accurate enough, it is a major source of "jitter". Time base generators on the market according to their accuracy, from low to high, are quartz, oscillators (OSC), temperature-compensated crystal oscillators (TCXO), constant temperature crystal oscillators (OCXO), rubidium atomic clocks, etc. Even satellite positioning systems (GPS) can provide the time base required by the above-mentioned digital devices. At present, the frequency generated by the time base generator is mostly 10 MHz.

In response to the industry's testing needs for large-capacity industrial equipment or various products, a large-capacity power supply system is required. If the demand for large capacity is achieved with a single power supply, the cost is too high. Therefore, multiple power supplies are connected in parallel by means of out of phase to achieve the needs of large capacity and high frequency. When multiple power supplies are connected in parallel and if the time bases of the power supplies cannot be synchronized, it will cause errors in the switching frequency to bring electromagnetic interference and resonance. Accordingly, the inventor of the present invention has devoted himself based on his many years of practical experiences to solve these problems.

SUMMARY OF THE INVENTION

The primary object of the present invention is to provide a switching AC/DC power supply system with a 10 MHz time base, so that the time bases of multiple AC/DC power supplies connected to one another can be completely synchronized, thereby eliminating electromagnetic interference, reducing the output ripple rate, eliminating frequency errors between the power supplies, and providing a high-quality AC/DC power source.

In order to achieve the above object, the present invention provides a switching AC/DC power supply system with a 10 MHz time base, comprising a master, at least one slave, and at least one connection cable. The master includes a time base generator, a time base processing circuit, and a port. The time base generator is configured to provide a time base of 10 MHz and connected to the time base processing circuit. The port is connected to the time base generator. The slave also includes a time base generator, a time base processing circuit, a selector switch, and a port. The time base generator of the slave is configured to provide a time base of 10 MHz. The time base processing circuit is selectively connected to the time base generator of the slave or the port of the slave through the selector switch. The connection cable is connected to the port of the master and the port of the slave for connecting the master and the slave.

When the slave is connected to the master through the connection cable and the selector switch is switched to be connected with the port, the time base generated by the time base generator of the master is inputted to the time base processing circuit of the slave through the connection cable. Thereby, the time base generator of the master is connected to the time base processing circuit of the master and the time base processing circuit of the slave, so that the slave and the master have the synchronized time base, so as to obtain a high-quality AC/DC power with low output ripple rate and low EMI noise.

DETAILED DESCRIPTION OF THE PREFERRED EMBODIMENTS

Embodiments of the present invention will now be described, by way of example only, with reference to the accompanying drawings.

Figure 1:
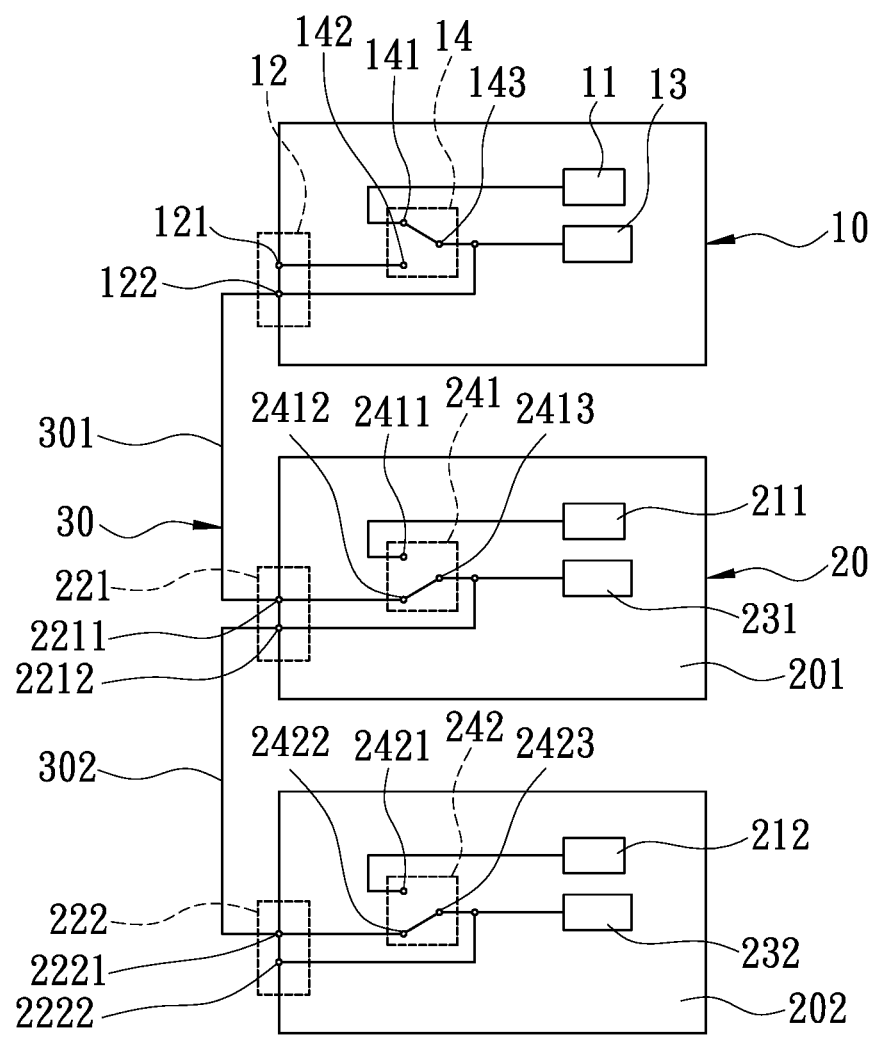
FIG. 1 is a block diagram according to a first embodiment of the present invention.

As shown in FIG. 1, the present discloses a switching AC/DC power supply system with a 10 MHz time base. The system comprises a master 10, at least one slave 20, and at least one connection cable 30.

The master 10 selectively outputs a DC voltage or converts the DC voltage to an AC voltage for supplying an AC/DC power source. The master 10 includes a time base generator 11, a selector switch 14, a time base processing circuit 13, and a port 12.

The time base generator 11 is configured to provide a time base of 10 MHz. In this embodiment, the time base generator 11 is a temperature-compensated crystal oscillator (TCXO).

The selector switch 14 is a manual switch. One end of the selector switch 14 is provided with a first contact 141 and a second contact 142, and the other end of the selector switch 14 is provided with a third contact 143. The third contact 143 is selectively connected to the first contact 141 to form a path, or the third contact 143 is selectively connected to the second contact 142 to form a path. The first contact 141 is connected to the time base generator 11. The second contact 142 is connected to an external port. In the first embodiment of the present invention, when the selector switch 14 has no external connection at the second contact 142, the third contact 143 is selectively connected to the first contact 141.

The time base processing circuit 13 is connected to the third contact 143 of the selector switch 14 to receive the time base of the time base generator 11 or an external time base and to perform frequency division, so as to provide the required frequency for each electronic component or control circuit.

Figure 2:
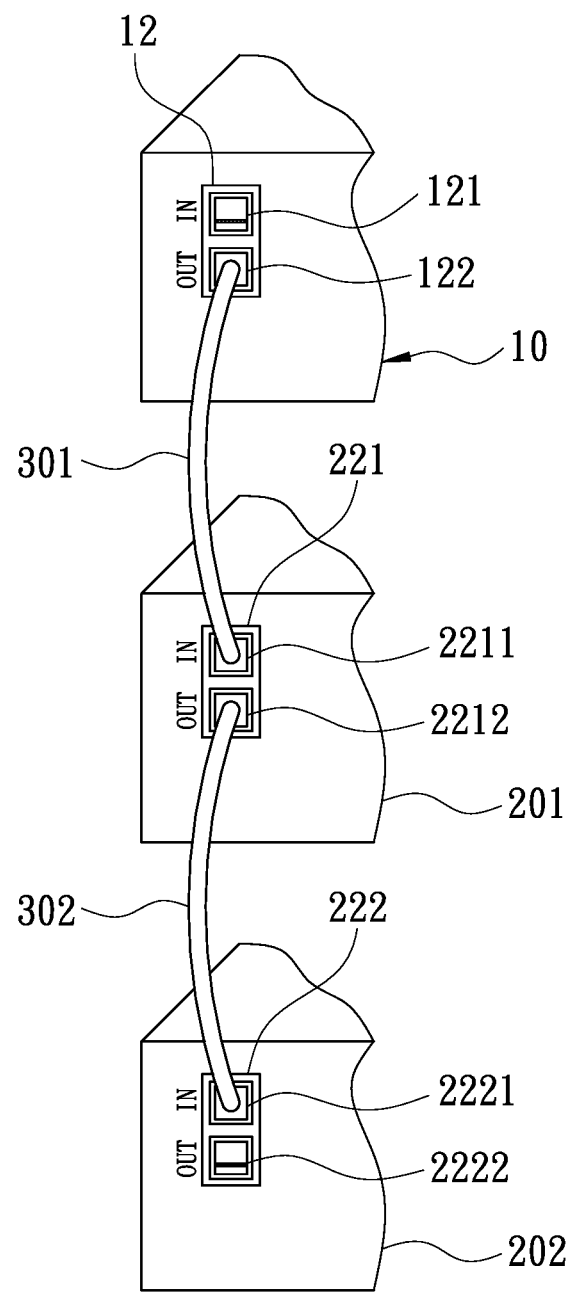
FIG. 2 is a schematic view of a port according to the first embodiment of the present invention.

The port 12 is connected to the selector switch 14. In the first embodiment of the present invention, the port 12 of the master 10 further includes an input port 121 and an output port 122. The input port 121 is connected to the second contact 142 of the selector switch 14, and the output port 122 is connected to the third contact 143 of the selector switch 14. As shown in FIG. 2, the input port 121 and the output port 122 may be RJ45 ports. But, this is only an embodiment, not a limitation on the implementation of the present invention. The input port 121 and the output port 122 may be other communication ports, such as SMA, BNC, or optical fiber ports.

The at least one slave 20, in this embodiment, includes a first slave 201 and a second slave 202. The at least one slave 20 selectively outputs a DC voltage or converts the DC voltage source to an AC voltage for supplying an AC/DC power source.

The first slave 201 includes a time base generator 211, a selector switch 241, a time base processing circuit 231, and a port 221.

The time base generator 211 is configured to provide a time bae of 10 MHz. In this embodiment, the time base generator 211 is a temperature-compensated crystal oscillator (TCXO).

The selector switch 241 is a manual switch. One end of the selector switch 241 is provided with a first contact 2411 and a second contact 2412, and the other end of the selector switch 241 is provided with a third contact 2413. The third contact 2413 is selectively connected to the second contact 2412 to form a path, or the third contact 2413 is selectively connected to the first contact 2411 to form a path. The first contact 2411 of the selector switch 241 is connected to the time base generator 211, so that the selector switch 241 is selectively switched to be connected to or disconnected from the time base generator 211. In the first embodiment of the present invention, the selector switch 241 is manually switched to a state in which the second contact 2412 is connected to the third contact 2413.

The time base processing circuit 231 is connected to the third contact 2413 of the selector switch 241 to receive the time base inputted from the third contact 2413 and to perform frequency division, so as to provide the required frequency for each electronic component or control circuit.

The port 221 is connected to the selector switch 241. In the first embodiment of the present invention, the port 221 of the first slave 201 includes an input port 2211 and an output port 2212. The input port 2211 is connected to the second contact 2412 of the selector switch 241. The output port 2212 is connected to the third contact 2413 of the selector switch 241, and can be connected to the time base processing circuit 231 to form a path. That is, by switching the selector switch 241, the time base processing circuit 231 can be connected to the port 221, not connected to the time base generator 211. As shown in FIG. 2, the input port 2211 and the output port 2212 are also RJ45 ports.

The second slave 202 includes a time base generator 212, a selector switch 242, a time base processing circuit 232, and a port 222.

The time base generator 212 is configured to provide a time bae of 10 MHz. In this embodiment, the time base generator 212 is a temperature-compensated crystal oscillator (TCXO).

The selector switch 242 is a manual switch. One end of the selector switch 242 is provided with a first contact 2421 and a second contact 2422, and the other end of the selector switch 242 is provided with a third contact 2423. The third contact 2423 may be selectively connected to the second contact 2422 to form a path, or the third contact 2423 may be selectively connected to the first contact 2421 to form a path. The first contact 2421 of the selector switch 242 is connected to the time base generator 212, so that the selector switch 242 is selectively switched to be connected with or disconnected from the time base generator 212. In the first embodiment of the present invention, the selector switch 242 is manually switched to a state in which the second contact 2422 is connected to the third contact 2423.

The time base processing circuit 232 is connected to the third contact 2423 of the selector switch 242 to receive the time base inputted from the third contact 2423 and to perform frequency division, so as to provide the required frequency for each electronic component or control circuit.

The port 222 is connected to the selector switch 242. In the first embodiment of the present invention, the port 222 of the second slave 202 includes an input port 2221 and an output port 2222. The input port 2221 is connected to the second contact 2422 of the selector switch 242. The output port 2222 is connected to the third contact 2423 of the selector switch 242, and is further connected to the time base processing circuit 232 to form a path. That is, by switching the selector switch 242, the time base processing circuit 232 is connected to the port 222, not connected to the time base generator 212. As shown in FIG. 2, the input port 2221 and the output port 2222 are also RJ45 ports.

In this embodiment, the at least one connection cable 30 includes a first connection cable 301 and a second connection cable 302. The first connection cable 301 is connected to the output port 122 of the master 10 and the input port 2211 of the first slave 201 for connecting the master 10 and the first slave 201. The second connection cable 302 is connected to the output port 2212 of the first slave 201 and the input port 2221 of the second slave 202 for connecting the first slave 201 and the second slave 202.

In order to further understand the structural features, the technical means and the expected effects of the present invention, the present invention is described in more detail.

When the master and each slave are independent and not connected to each other, the master 10 can output a DC voltage or convert the DC voltage to an AC voltage through the time base provided by the time base generator 11. At the same time, the first slave 201 and the second slave 202 can also output a DC voltage or convert the DC voltage to an AC voltage through the time bases provided by their own time base generators 211, 212. However, since the time bases of the master 10 and the slaves 201, 202 are from the respective time base generators 11, 211, 212, the time bases cannot be synchronized.

When the master and each slave are connected to each other, as shown in FIG. 1, the first slave 201 is connected to the master 10 through the first connection cable 301. The third contact 143 of the selector switch 14 of the master 10 is selectively connected to the first contact 141, so that the time base generator 11 of the master 10 is connected to the time base processing circuit 13 through the selector switch 14. The time base processing circuit 13 can receive the time base of the time base generator 11 of the master 10 to perform frequency division by the time base processing circuit 13 and can further output the time base of the master 10 through the output port 122 of the master 10. The time base of the master 10 can be inputted to the time base processing circuit 231 of the first slave 201 through the first connection cable 301 and the input port 2211 of the first slave 201 and the selector switch 241. When the first connection cable 301 is connected to the first slave 201, the selector switch 241 of the first slave 201 can be manually switched for the third contact 2413 to be connected with the second contact 2412. Therefore, the time base processing circuit 231 of the first slave 201 can perform frequency division according to the time base generated by the time base generator 11 of the master 10. Thereby, the time base generated by the time base generator 11 of the master 10 is synchronously outputted to the time base processing circuit 13 of the master 10 and the time base processing circuit 231 of the first slave 201, so that the first slave 201 has a synchronized time base with the master 10.

When the second slave 202 is further connected, the selector switch 242 of the second slave 202 is also switched for the third contact 2423 to be connected with the second contact 2422, so that the time base of the master 10 can be further inputted to the time base processing circuit 232 of the second slave 202 through the second connection cable 302 and the input port 2221 of the second slave 202 and the selector switch 242. The time base processing circuit 232 can receive the time base generated by the time base generator 11 of the master 10 and further perform frequency division by the time base processing circuit 232. When the second connection cable 302 is connected to the second slave 202, the selector switch 242 of the second slave 202 is also manually switched for the third contact 2413 to be connected with the second contact 2412. Therefore, the time base processing circuit 232 of the second slave 202 also performs frequency division according to the time base generated by the time base generator 11 of the master 10. Thereby, the time base of the master 10 is further synchronously outputted to the time base processing circuit 232 of the second slave 202, so that the second slave 202 has a synchronized time base with the first slave 201 and the master 10. The master 10, the first slave 201 and the second slave 202 provide a synchronized AC/DC power source with the same frequency and phase.

It is worth mentioning that the present invention allows the master 10, the first slave 201 and the second slave 202 to have a direct point-to-point connection through the first connection cable 301 and the second connection cable 302 to avoid delay, so as to provide the highest accuracy and the best synchronous output.

Figure 3:
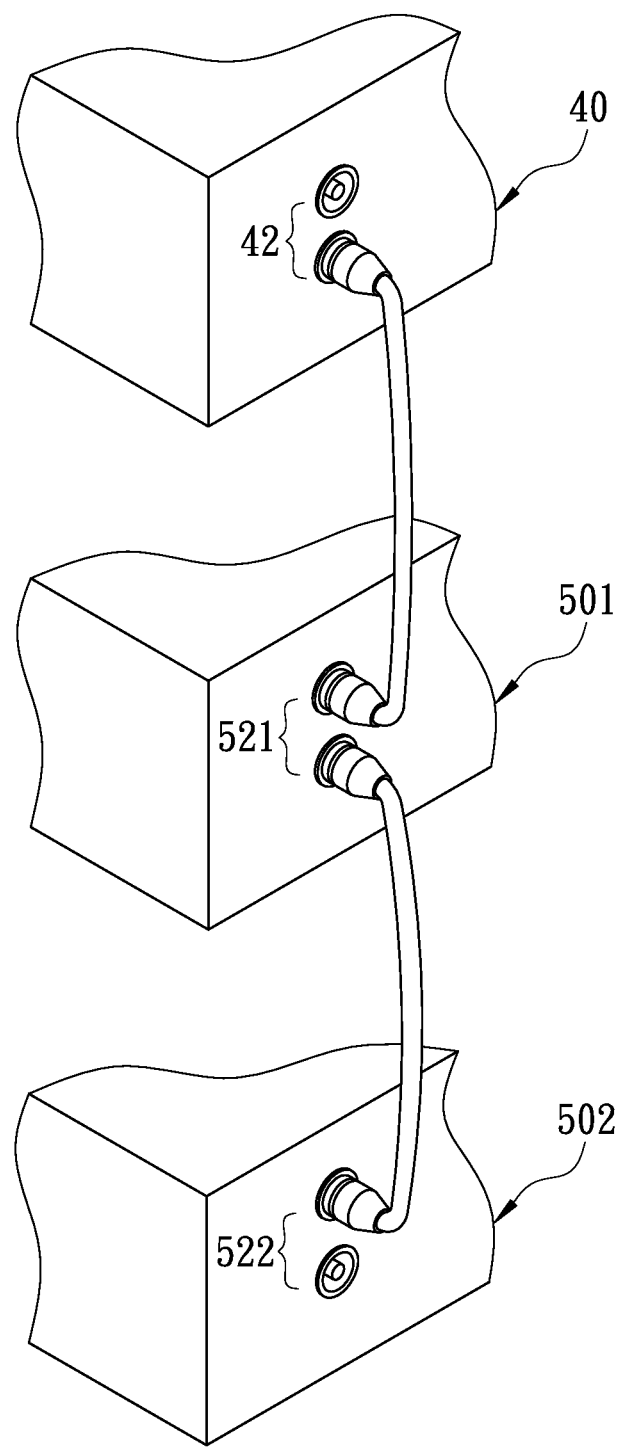
FIG. 3 is a schematic view of a port according to a second embodiment of the present invention.

FIG. 3 illustrates a second embodiment of the present invention. The second embodiment is substantially similar to the first embodiment with the exceptions described hereinafter. A port 42 of a master 40, a port 521 of a first slave 501 and a port 522 of a second slave 502 all use BNC ports for mutual connection.

Figure 4:
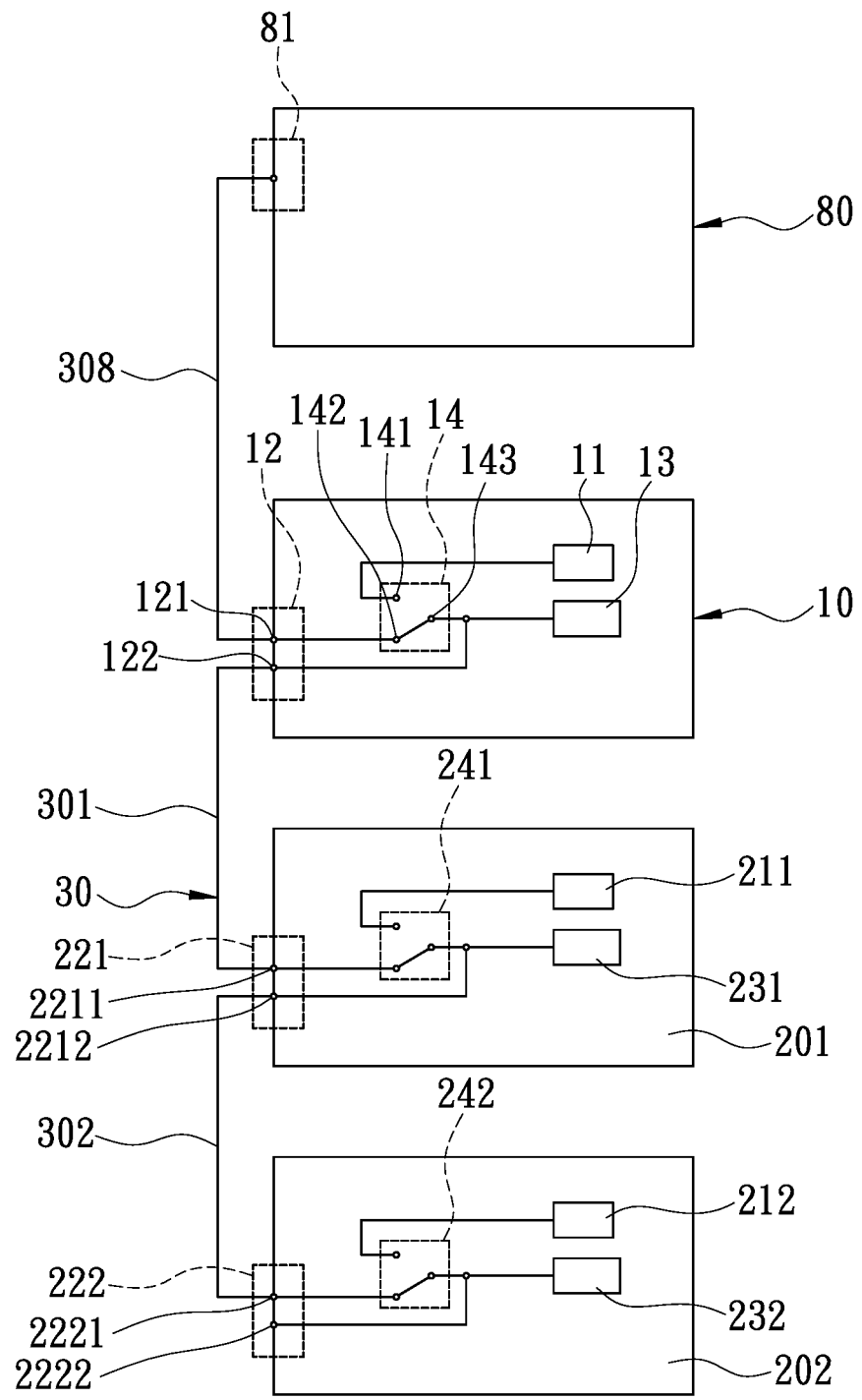
FIG. 4 is a block diagram according to a third embodiment of the present invention.

FIG. 4 illustrates a third embodiment of the present invention. The third embodiment is substantially similar to the first embodiment with the exceptions described hereinafter.

This embodiment further includes an external device 80 which can provide a time bae of 10 MHz, such as a Rubidium Frequency Standard Oscillator, model SRS FS725, etc. The external device 80 includes a port 81 for an external connection cable 308 to connect the port 81 of the external device 80 and the input port 121 of the master 10, thereby connecting the master 10 and the external device 80. At this time, the selector switch 14 is switched to a state in which the second contact 142 is connected to the third contact 143, so that the time base processing circuit 13 of the mast 10 is changed to receive the time base of the external device 80. With the high frequency accuracy of the external device 80, a more precise and accurate time base frequency is provided to the master 10. Thereby, the master 10 has higher time accuracy to meet the requirement for higher accuracy.

More specifically, when the master 10 is connected to the external device 80 through the external connection cable 308, the selector switch 14 of the master 10 is switched for the third contact 143 to be connected to the second contact 142. The time base generator 11 of the master 10 is not connected to the time base processing circuit 13. Therefore, the time base processing circuit 13 of the master 10 can receive the time base of the external device 80 and perform frequency division, thereby enabling the master 10 to synchronize with the time base of the external device 80.

Figure 5:
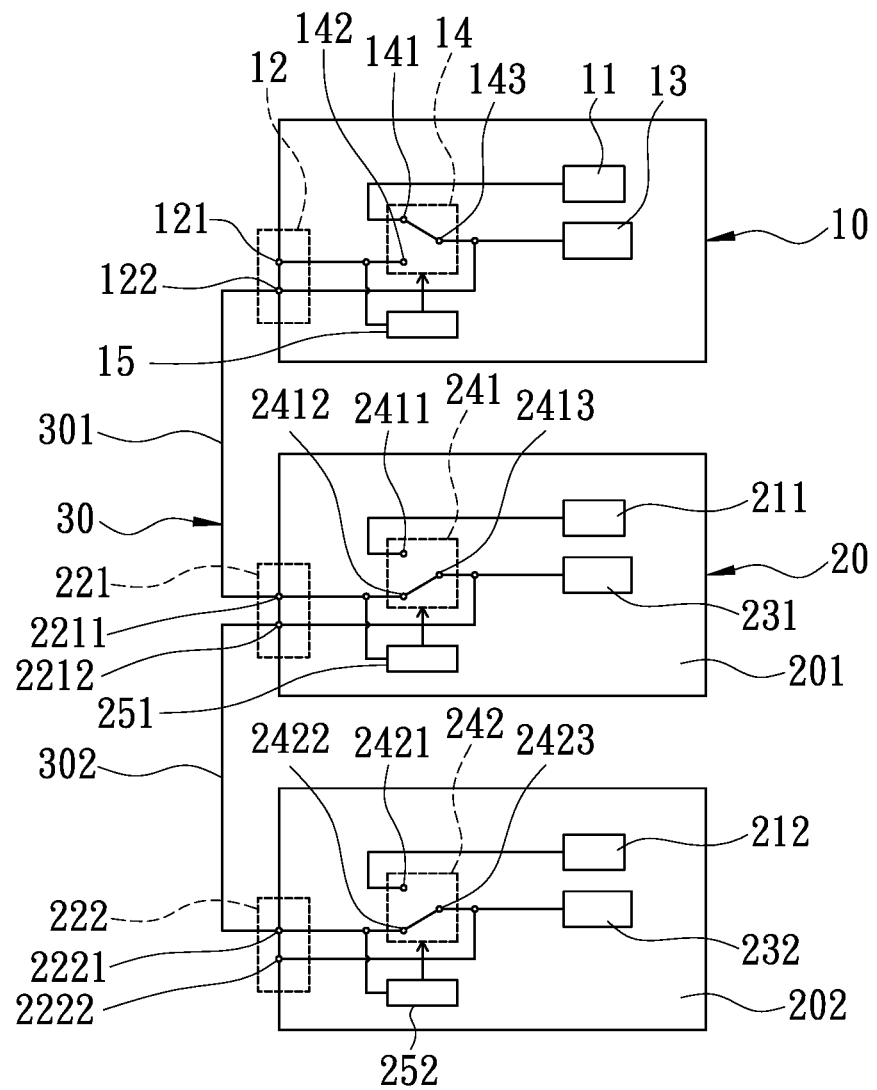
FIG. 5 is a block diagram according to a fourth embodiment of the present invention.

FIG. 5 illustrates a fourth embodiment of the present invention. The fourth embodiment is substantially similar to the first embodiment with the exceptions described hereinafter.

The selector switches 14, 241, 242 of the master 10, the first slave 201 and the second slave 202 are electronic switches. The master 10, the first slave 201 and the second slave 202 each include a detection circuit 15, 251, 252. One end of the detection circuit 15 is electrically connected to the input port 121 of the port 12, and the other end of the detection circuit 15 is electrically connected to the selector switch 14. One end of the detection circuit 251 is electrically connected to the input port 2211 of the port 221, and the other end of the detection circuit 251 is electrically connected to the selector switch 241. One end of the detection circuit 252 is electrically connected to the input port 2221 of the port 222, and the other end of the detection circuit 252 is electrically connected to the selector switch 242.

When the first slave 201 is connected to the master 10 through the first connection cable 301, the detection circuit 251 automatically detects that the input port 2211 has a time base signal from the external input. The third contact 2413 of the selector switch 241 is switched for connecting the second contact 2412, so that the time base processing circuit 231 of the first slave 201 is changed to receive the base time provided by the time base generator 11 of the master 10. Similarly, when the second slave 202 is connected to the first slave 201 through the second connection cable 302, the detection circuit 252 automatically detects the input port 2221 has a time base signal from the external input. The third contact 2423 of the selector switch 242 is switched for connecting the second contact 2422, so that the time base processing circuit 232 is changed to receive the base time provided by the time base generator 11 of the master 10.

Figure 6:
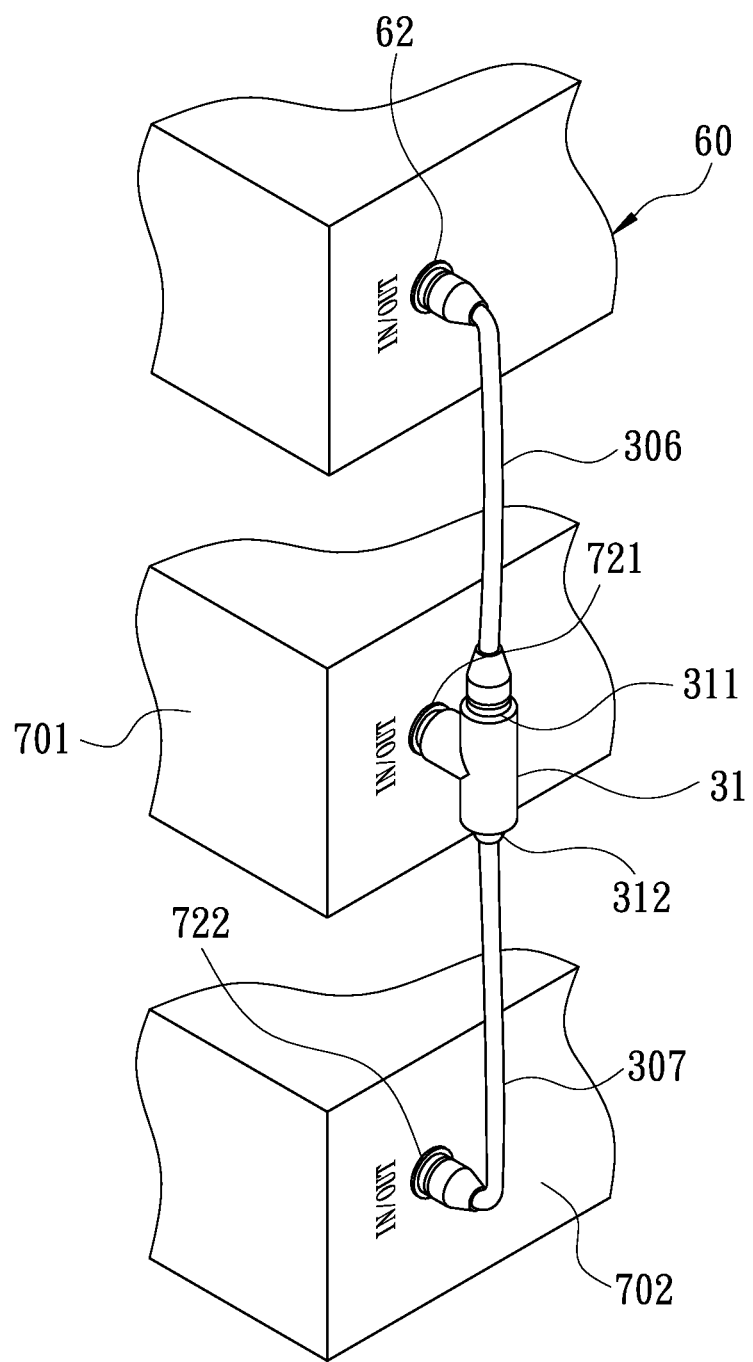
FIG. 6 is a schematic view of a port according to a fifth embodiment of the present invention.
Figure 7:
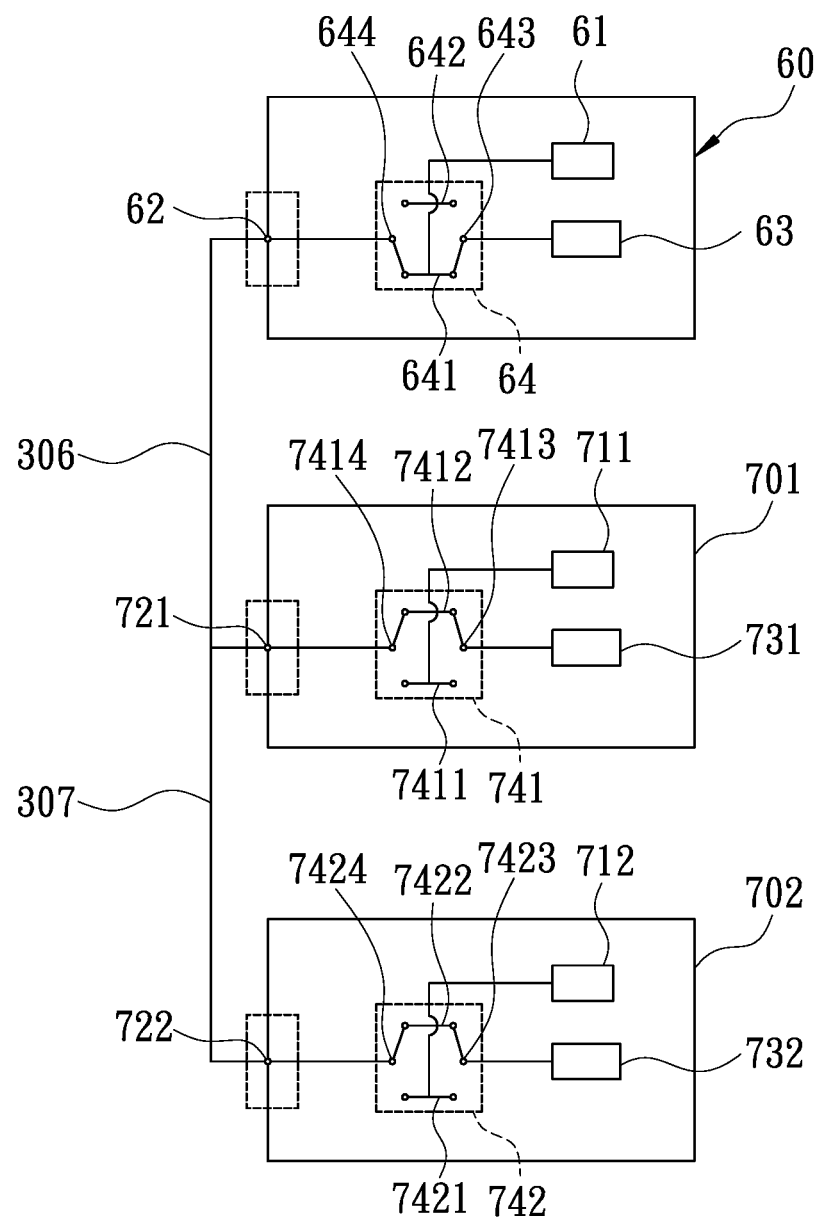
FIG. 7 is a block diagram according to the fifth embodiment of the present invention.

FIG. 6 and FIG. 7 illustrate a fifth embodiment of the present invention. The fifth embodiment is substantially similar to the first embodiment with the exceptions described hereinafter. The system comprises a master 60, a first slave 701, a second slave 702, and at least one connection cable 30.

The master 60 has a port 62. The port 62 is a common port for input and output, and the port 62 is a BNC port. But, this is only an embodiment, not a limitation on the implementation of the present invention. The port 62 may be a SMA, BNC, or optical fiber port. A selector switch 64 includes a first contact 641, a second contact 642, a third contact 643, and a fourth contact 644. The first contact 641 is connected to a time base generator 61. The third contact 643 is connected to a time base processing circuit 63. The fourth contact 644 is connected to the port 62. Both the third contact 643 and the fourth contact 644 are selectively connected to the first contact 641 to form a path, or both the third contact 643 and the fourth contact 644 are selectively connected to the second contact 642 to form a path. When the selector switch 64 has no external input from the fourth contact 644, the third contact 643 and the fourth contact 644 are selectively connected to the first contact 641, so that the time base of the time base processing circuit 63 of the master 60 is provided by the time base generator 61.

The first slave 701 has a port 721 that is also a common port for input and output. The port 721 is also a BNC port. The selector switch 741 includes a first contact 7411, a second contact 7412, a third contact 7413, and a fourth contact 7414. The first contact 7411 is connected to a time base generator 711. The third contact 7413 is connected to a time base processing circuit 731. The fourth contact 7414 is connected to the port 721. Both the third contact 7413 and the fourth contact 7414 are selectively connected to the first contact 7411 to form a path, or both the third contact 7413 and the fourth contact 7414 are selectively connected to the second contact 7412 to form a path.

The second slave 702 has a port 722 which is also a common port for input and output. The port 722 is also a BNC port. The selector switch 742 includes a first contact 7421, a second contact 7422, a third contact 7423, and a fourth contact 7424. The first contact 7421 is connected to a time base generator 712. The third contact 7423 is connected to a time base processing circuit 732. The fourth contact 7424 is connected to the port 722. Both the third contact 7423 and the fourth contact 7424 are selectively connected to the first contact 7421 to form a path, or both the third contact 7423 and the fourth contact 7424 are selectively connected to the second contact 7422 to form a path.

The at least one connection cable 30, in this embodiment, includes a first connection cable 306, a second connection cable 307, and a three-way connector 31. The three-way connector 31 is plugged to the port 721 of the first slave 701, so that the port 721 of the first slave 701 can be used for input or output through a first connector 311 and a second connector 312 of the three-way connector 31, respectively. Two ends of the first connection cable 306 are respectively connected to the port 62 of the master 60 and the first connector 311 of the three-way connector 31, so as to connect the master 60 and the first slave 701. Two ends of the second connection cable 307 are respectively connected to the second connector 312 of the three-way connector 31 and the port 722 of the second slave 702, so as to connect the first slave 701 and the second slave 702.

When the first slave 701 is connected to the master 60, the time base processing circuit 63 of the master 60 can receive the time base generated by the time base generator 61 of the master 60 through the selector switch 64, and can further output the time base of the master 60 through the port 62. The time base of the master 60 can be inputted to the time base processing circuit 731 of the first slave 701 through the first connection cable 306 and the port 721 of the first slave 701 and the selector switch 741. When the first connection cable 306 is connected to the first slave 701, the selector switch 741 of the first slave 701 can be manually switched for the third contact 7423 and the fourth contact 7424 to be connected with the second contact 7412. Therefore, the time base processing circuit 731 of the first slave 701 can receive the time base generated by the time base generator 61 of the master 60 and perform frequency division according to the time base generated by the time base generator 61 of the master 60. Thereby, the first slave 701 has a synchronized time base with the master 60.

Similarly, when the second slave 702 is further connected to the first slave 701, the selector switch 742 of the second slave 702 is also switched for the third contact 7423 and the fourth contact 7424 to be connected with the second contact 7422, so that the time base processing circuit 732 receives the time base provided by the time base generator 61 of the master 60 and performs frequency division according to the time base generated by the time base generator 61 of the master 60.

Thereby, the second slave 702 has a synchronized time base with the first slave 701 and the master 60. The master 60, the first slave 701 and the second slave 702 provide a synchronized AC/DC power source with the same frequency and phase.

The features and the expected effects of the present invention are described as follows:

In the switching AC/DC power supply system with a 10 MHz time base of the present invention, the slaves are connected to the master through the connection cables. When the selector switches of the slaves are switched for the ports of the slaves are connected to the time base processing circuits of the slaves, the time base generated by the time base generator of the master can be outputted to the time base processing circuits of the slaves, so that the slaves have a synchronized time base with the master. By synchronizing the time base, the start-up timing of each PWM IC and the phase and frequency of the PWM can be controlled. Furthermore, the opposite phase and out of phase technology can be further used, so that the output ripple rate is lower and the EMI noise is less, so as to obtain a high-quality AC/DC output power source.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A switching AC/DC power supply system with a 10 MHz time base, comprising:
    a master, configured to supply an AC/DC power source, the master including:
    a time base generator, configured to provide a time base of 10 MHz;
    a time base processing circuit, connected to the time base generator for performing frequency division;
    a port, connected to the time base generator;
    at least one slave, configured to supply an AC/DC power source, the slave including:
    a time base generator, configured to provide a time base of 10 MHz;
    a selector switch, one end of selector switch being selectively switched to be connected with or disconnected from the time base generator of the slave;
    a time base processing circuit, connected to another end of the selector switch for performing frequency division;
    a port, by switching the selector switch, the time base processing circuit of the slave being connected to the port of the slave, not connected to the time base generator of the slave;
    at least one connection cable, connected to the port of the master and the port of the slave for connecting the master and the slave;
    wherein when the slave is connected to the master through the connection cable, and the selector switch of the slave is switched for the port of the slave to be connected to the time base processing circuit of the slave, the time base generated by the time base generator of the master is inputted to the time base processing circuit of the slave through the connection cable, so that the slave and the master have synchronized time bases.

2. The switching AC/DC power supply system as claimed in claim 1, wherein the port of the slave includes an input port and an output port, the selector switch includes a first contact, a second contact and a third contact, the first contact is connected to the time base generator of the slave, the second contact is connected to the input port, the third contact is connected to the time base processing circuit of the slave and the output port, and the third contact is selectively connected to the second contact or the first contact to form a path.

3. The switching AC/DC power supply system as claimed in claim 1, wherein the selector switch of the slave is an electronic switch, the slave further includes a detection circuit, one end of the detection circuit of the slave is electrically connected to the port of the slave, and another end of the detection circuit is electrically connected to the selector switch of the slave.

4. The switching AC/DC power supply system as claimed in claim 1, further comprising an external device configured to provide a time base of 10 MHz, the external device being connected to the port of the master, the master further including a selector switch, one end of the selector switch of the master being selectively switched to be connected to the time base generator of the master or the external device, another end of the selector switch of the master being connected to the time base processing circuit of the master so that the time base generator of the master can obtain the time base of the external device by switching the selector switch of the master.

5. The switching AC/DC power supply system as claimed in claim 1, wherein the port of the slave is a common port for input and output, the selector switch includes a first contact, a second contact, a third contact and a fourth contact, the first contact is connected to the time base generator of the slave, the third contact is connected to the time base processing circuit of the slave, the fourth contact is connected to the port of the slave, the third contact and the fourth contact are selectively connected to the first contact or the second contact to form a path.

* * * * *